United States Patent
Nakahara et al.

(10) Patent No.: US 12,255,551 B2
(45) Date of Patent: Mar. 18, 2025

(54) POWER CONVERSION DEVICE AND METAL PROCESSING DEVICE

(71) Applicant: Hitachi Industrial Equipment Systems Co., Ltd., Tokyo (JP)

(72) Inventors: Mizuki Nakahara, Tokyo (JP); Hirooki Tokoi, Tokyo (JP); Kenji Ikeda, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 202 days.

(21) Appl. No.: 18/010,851

(22) PCT Filed: May 27, 2021

(86) PCT No.: PCT/JP2021/020293
§ 371 (c)(1),
(2) Date: Dec. 16, 2022

(87) PCT Pub. No.: WO2022/030082
PCT Pub. Date: Feb. 10, 2022

(65) Prior Publication Data
US 2023/0238897 A1    Jul. 27, 2023

(30) Foreign Application Priority Data
Aug. 3, 2020   (JP) .............................. 2020-131332

(51) Int. Cl.
*H02M 3/158* (2006.01)
*H02M 5/458* (2006.01)
(Continued)

(52) U.S. Cl.
CPC ....... *H02M 7/53871* (2013.01); *H02M 3/158* (2013.01); *H02M 5/458* (2013.01); *H02M 7/06* (2013.01); *H02P 27/08* (2013.01)

(58) Field of Classification Search
CPC .. H02M 7/53871; H02M 3/158; H02M 5/458; H02M 7/06; H02P 27/08
(Continued)

(56) References Cited

U.S. PATENT DOCUMENTS 6,244,061 B1 *   6/2001   Takagi ................. F25B 49/025
                                                         62/229
7,274,579 B2      9/2007   Ueda et al.
(Continued)

FOREIGN PATENT DOCUMENTS

| CN | 109428533 B | 4/2020 |
|----|-------------|--------|
| CN | 111193461 A | 5/2020 |

(Continued)

OTHER PUBLICATIONS

Takegawa (JP 2000050669 A). Driver for DC Brushless Motor Date Published Feb. 18, 2000 (Year: 2000).*
(Continued)

*Primary Examiner* — Jorge L Carrasquillo
(74) *Attorney, Agent, or Firm* — Crowell & Moring LLP

(57) ABSTRACT

A power conversion device capable of shortening the time required for acceleration of a motor and a metal processing device including the power conversion device are provided. Then, a power conversion device 10 includes a converter 100 configured to convert an AC voltage from outside to a DC voltage Vo and a converter controller 107 configured to control the converter 100. The converter 100 includes a voltage doubler circuit 104 configured to boost the DC voltage Vo when activated, and outputs the DC voltage Vo having a voltage value different in accordance with the activation and stop of the voltage doubler circuit 104. The converter controller 107 activates the voltage doubler circuit 104 at a first time that is earlier by a predetermined period
(Continued)

than a second time at which a speed command value ω* of the motor 130 rises from a predetermined value.

9 Claims, 7 Drawing Sheets

(51) Int. Cl.
    *H02M 7/06*         (2006.01)
    *H02M 7/5387*     (2007.01)
    *H02P 27/08*       (2006.01)

(58) Field of Classification Search
    USPC ........................................................ 318/504
    See application file for complete search history.

(56) References Cited

U.S. PATENT DOCUMENTS

| | | |
|---|---|---|
| 7,646,165 B2 | 1/2010 | Ueda et al. |
| 10,158,299 B1 | 12/2018 | Wei et al. |
| 10,566,923 B2 | 2/2020 | Kuroki |
| 11,063,505 B2 | 7/2021 | Hasimoto |
| 2020/0198279 A1* | 6/2020 | Masato ............... H02J 7/00714 |

FOREIGN PATENT DOCUMENTS

| | | |
|---|---|---|
| JP | 2000-50669 A | 2/2000 |
| JP | 2000-188867 A | 7/2000 |
| JP | 2001-95262 A | 4/2001 |
| JP | 2002-64992 A | 2/2002 |
| JP | 2003-319676 A | 11/2003 |
| JP | 2005-110491 A | 4/2005 |
| JP | 2005-137168 A | 5/2005 |
| JP | 2017-38841 A | 2/2017 |
| JP | 2020-31507 A | 2/2020 |
| TW | 202011683 A | 3/2020 |

OTHER PUBLICATIONS

Ueda et al. (JP 2005110491 A) Converter Circuit and Motor Drive Device Date Published Apr. 2, 2005 (Year: 2005).*
Nakahara et al. (JP 2020031507 A) Power Conversion Device and Inverter Device Using the Same Date Published Feb. 2, 2020 (Year: 2020).*
International Search Report (PCT/ISA/210) issued in PCT Application No. PCT/JP2021/020293 dated Aug. 3, 2021 with English translation (four (4) pages).
Japanese-language Written Opinion (PCT/ISA/237) issued in PCT Application No. PCT/JP2021/020293 dated Aug. 3, 2021 (three (3) pages).
Taiwanese-language Office Action issued in Taiwanese Application No. 110125512 dated Feb. 24, 2022 with English translation (nine (9) pages).
Extended European Search Report issued in European Application No. 21854102.7 dated Aug. 20, 2024 (8 pages).

* cited by examiner

POWER CONVERSION DEVICE AND METAL PROCESSING DEVICE

TECHNICAL FIELD

The present invention relates to a power conversion device and a metal processing device, and relates to, for example, a power conversion device including a voltage doubler rectifier circuit and a metal processing device including the power conversion device.

BACKGROUND ART

The inverter device described in Patent Document 1 includes a voltage doubler circuit capable of switching between a full-wave rectification mode and a voltage doubler rectification mode depending on a load state of a motor. The DC voltage from the voltage doubler circuit becomes a full-wave rectified voltage (once) in the full-wave rectification mode, and becomes a double voltage (twice) in the voltage doubler rectification mode. Accordingly, in the voltage doubler rectification mode, the output voltage of the inverter operated by the DC voltage from the voltage doubler circuit can be doubled as compared with the full-wave rectification mode.

In addition, Patent Document 1 focuses on an operation of switching from the full-wave rectification mode to the voltage doubler rectification mode. When the control circuit receives a motor acceleration command from a load machine such as a refrigerator, the voltage doubler circuit boosts the DC voltage by using the voltage doubler rectification mode. When boosting the DC voltage is completed, the motor starts acceleration and accelerates to a desired rotation speed. In this way, it is possible to increase the motor rotation speed and improve the cooling performance when rapid cooling in the refrigerator is required.

RELATED ART DOCUMENTS

Patent Documents

Patent Document 1: Japanese Unexamined Patent Application Publication No. 2002-64992

SUMMARY OF THE INVENTION

Problems to be Solved by the Invention

A power conversion device that converts DC power into three-phase AC power has been widely used for the purpose of variable speed control of a motor. In such a power conversion device, it is common to convert a commercial power supply (three-phase 200 V or the like) into DC power by a rectifier circuit and output AC power having an arbitrary voltage or frequency by an inverter on a latter stage. In a rectifier circuit provided in the power conversion device, a three-phase AC voltage is often subjected to full-wave rectification, and a DC voltage from the rectifier circuit is approximately $\sqrt{2}$ times the effective value of each line voltage to be input.

In general, the upper limit of the output voltage of the power conversion device is determined by the DC voltage supplied to the inverter, and it is not possible to output a voltage higher than the limit. On the other hand, in a general motor, the induced voltage increases as the rotation speed increases. Therefore, in order to rotate the motor at a higher speed, the inverter needs to output a higher voltage. For example, in a case where the load of the motor is a processing machine such as a press machine, reduction in tact time for improving productivity is required. For this purpose, a mechanism for driving the motor at high rotation speed and high acceleration is required.

In order to achieve the high-speed rotation of a motor, as disclosed in Patent Document 1, a method of boosting a DC voltage by using a voltage doubler circuit is known. However, in the method described in Patent Document 1, since boosting the DC voltage is started after receiving the motor acceleration command, the transient time associated with the boosting and the acceleration becomes longer. As a result, for example, when the method is applied to a servo motor for a processing machine that performs an operation of rapidly lowering a mechanism to pressurize a workpiece and then rapidly raising the mechanism, it may be difficult to realize a high-acceleration operation. Namely, it takes time to accelerate the motor, and there is a possibility that it becomes difficult to reduce the tact time of the processing machine.

The present invention has been made in view of the above circumstances, and one object thereof is to provide a power conversion device capable of shortening the time required for acceleration of a motor and a metal processing device including the power conversion device.

The above and other objects and novel features of the present invention will become apparent from the description of this specification and the accompanying drawings.

Means for Solving the Problems

An outline of a typical embodiment of the invention disclosed in this application will be briefly described as follows.

A power conversion device according to a typical embodiment of the present invention includes a converter configured to convert an AC voltage from outside into a DC voltage and a converter controller configured to control the converter, and is configured to supply power to a motor. The converter includes a voltage doubler circuit configured to boost the DC voltage when activated, and outputs the DC voltage having a voltage value different in accordance with activation and stop of the voltage doubler circuit. The converter controller activates the voltage doubler circuit at a first time that is earlier by a predetermined period than a second time at which a speed command value of the motor rises from a predetermined value.

Effects of the Invention

The effect obtained by the typical embodiment of the invention disclosed in this application will be briefly described below. That is, it is possible to shorten the time required for the acceleration of a motor.

BRIEF DESCRIPTIONS OF THE DRAWINGS

DETAILED DESCRIPTION OF PREFERRED EMBODIMENTS

Figure 1:
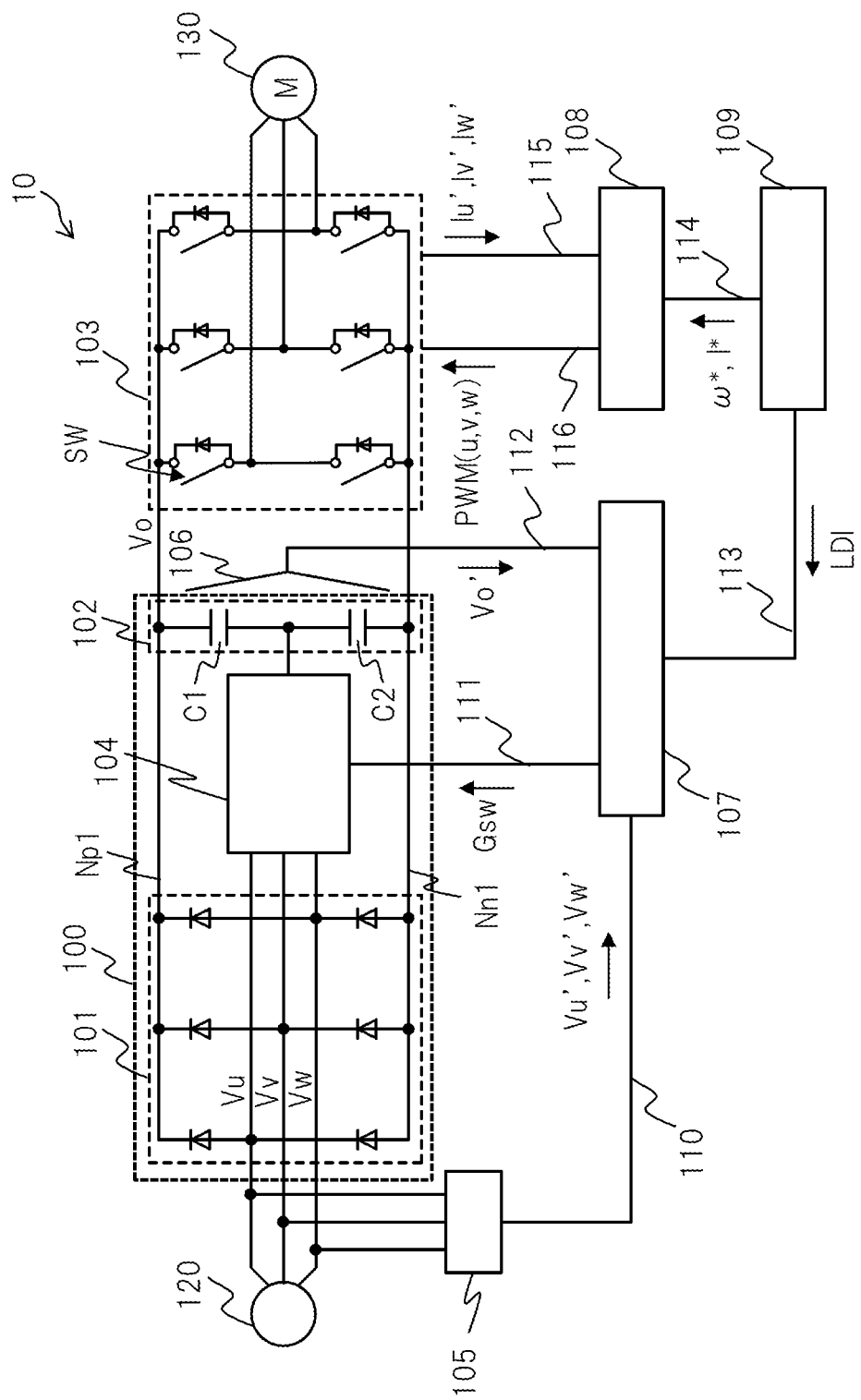
FIG. 1 is a circuit diagram showing a configuration example around a power conversion device according to the first embodiment of the present invention.

Hereinafter, embodiments of the present invention will be described in detail with reference to the drawings. Note that the same members are denoted by the same reference characters in all the drawings for describing the embodiments, and repetitive description thereof will be omitted in principle.

First Embodiment

Configuration of Power Conversion Device

FIG. 1 is a circuit diagram showing a configuration example around a power conversion device according to the first embodiment of the present invention. A power conversion device 10 shown in FIG. 1 is a device that supplies power to a motor 130. The motor 130 is, for example, a three-phase servo motor, and controls a position, a speed, and the like of a motor load (for example, press mechanism or the like (not shown)). The power conversion device 10 includes a converter 100, an inverter 103, an AC voltage sensor 105, a DC voltage sensor 106, a voltage doubler controller (converter controller) 107, and an inverter controller 108.

Further, for example, a load controller 109 is provided outside the power conversion device 10. The load controller 109 controls a sequence of the motor load (for example, press mechanism). The load controller 109 determines various driving conditions of the motor 130 in accordance with each sequence. Accordingly, the load controller 109 recognizes how to change the rotation speed, the torque (current), and the like of the motor 130 in time series.

The converter 100 receives three-phase AC power from an external three-phase AC power supply 120 and converts the three-phase AC voltage (Vu, Vv, Vw) into a DC voltage Vo. Specifically, the converter 100 includes a three-phase diode bridge 101, a DC link unit 102, and a voltage doubler circuit 104. In the three-phase diode bridge 101, the three-phase AC power from the three-phase AC power supply 120 is subjected to full-wave rectification, and is converted into the DC voltage Vo by the DC link unit 102. The DC link unit 102 includes two DC link capacitors C1 and C2 connected in series between a positive electrode output node Np1 and a negative electrode output node Nn1 of the three-phase diode bridge 101.

In this example, the voltage doubler circuit 104 receives the three-phase AC power from the three-phase AC power supply 120, and boosts the DC voltage Vo to a predetermined voltage via a common connection node of the DC link capacitors C1 and C2 when activated. Specifically, the voltage doubler circuit 104 boosts the DC voltage Vo to a double voltage of about twice by alternately charging the DC link capacitors C1 and C2. As a result, the converter 100 outputs the DC voltage Vo having a voltage value different in accordance with the activation and stop of the voltage doubler circuit 104 (in other words, depending on the voltage doubler rectification mode or the full-wave rectification mode). The DC voltage Vo becomes a full-wave rectified voltage in the full-wave rectification mode and becomes a double voltage in the voltage doubler rectification mode.

The AC voltage sensor 105 detects voltage values (Vu', Vv', Vw') of the respective phases of the three-phase AC power supply 120. The DC voltage sensor 106 detects a voltage value (Vo') of the DC voltage. The detection result of the AC voltage sensor 105 and the detection result of the DC voltage sensor 106 are input to the voltage doubler controller (converter controller) 107 via signal lines 110 and 112, respectively. The voltage doubler controller 107 performs switching control of a switching element (not shown) in the voltage doubler circuit 104 with a switching signal Gsw via a signal line 111 based on the detection results.

Further, load information (motor information) LDI is input from the load controller 109 to the voltage doubler controller 107 via a signal line 113. Although details will be described later, the load information LDI includes, for example, load power information and load control information. The voltage doubler controller 107 determines the activation time of the voltage doubler circuit 104 based on the load information LDI. Then, the voltage doubler controller 107 starts the switching control of the voltage doubler circuit 104 from the activation time.

In this example, the inverter 103 is composed of a three-phase inverter including six switching elements SW. The inverter 103 converts the DC voltage Vo from the converter 100 into an AC voltage (three-phase AC voltage) and outputs the AC voltage to the motor 130. The switching element SW is composed of, for example, an IGBT (Insulated Gate Bipolar Transistor), a MOSFET (Metal Oxide Semiconductor Field Effect Transistor), a thyristor, or the like. The inverter 103 includes a current sensor (not shown), and detects current values (Iu', Iv', Iw') of the respective phases by using the current sensor. The detection result of the current sensor is input to the inverter controller 108 via a signal line 115.

Further, a speed command value $\omega^*$, a torque command value (current command value) $I^*$, and the like from the load controller 109 are input to the inverter controller 108 via a signal line 114. The inverter controller 108 performs PI control (proportional-integral control) and the like such that the rotation speed of the motor 130 approaches the speed command value $\omega^*$. Alternatively, the inverter controller 108 performs PI control or the like such that the current value of the motor 130 (detected current values (Iu', Iv', Iw')) approaches the current command value $I^*$.

Then, the inverter controller 108 determines the duty ratio of the PWM signal by such PI control or the like, and generates PWM signals PWMu, PWMv, and PWMw of the respective phases by reflecting a predetermined conduction mode (for example, a 180° conduction mode). The inverter controller 108 performs switching control of each switching element SW in the inverter 103 with the PWM signals PWMu, PWMv, and PWMw.

In FIG. 1, the voltage doubler controller 107 and the inverter controller 108 are typically composed of one or more microcontrollers (microcomputers). The signal lines 110 to 116 are not limited to wired lines and may be wireless lines. Then, these are mounted on one or more wiring boards together with components constituting the converter 100, the inverter 103, and the like, and are disposed in a housing constituting the power conversion device 10. Also, the load controller 109 is typically disposed in a high-order device outside the power conversion device 10.

Note that the mounting method is of course not limited to such a method, and can be changed as appropriate. For example, part or all of the voltage doubler controller 107 and the inverter controller 108 may be composed of an FPGA (Field Programmable Gate Array), an ASIC (Application Specific Integrated Circuit), or the like. Namely, each controller may be configured as appropriate by software, hardware, or a combination thereof.

In addition, here, the three-phase (u-phase, v-phase, w-phase) configuration is used for both the converter 100 and the inverter 103, but any two-phase or more configuration is applicable. Further, although the motor 130 is driven by three-phase AC power using the inverter 103 here, the configuration in which the motor 130 is driven by the DC voltage Vo is also possible depending on cases.

Figure 2:
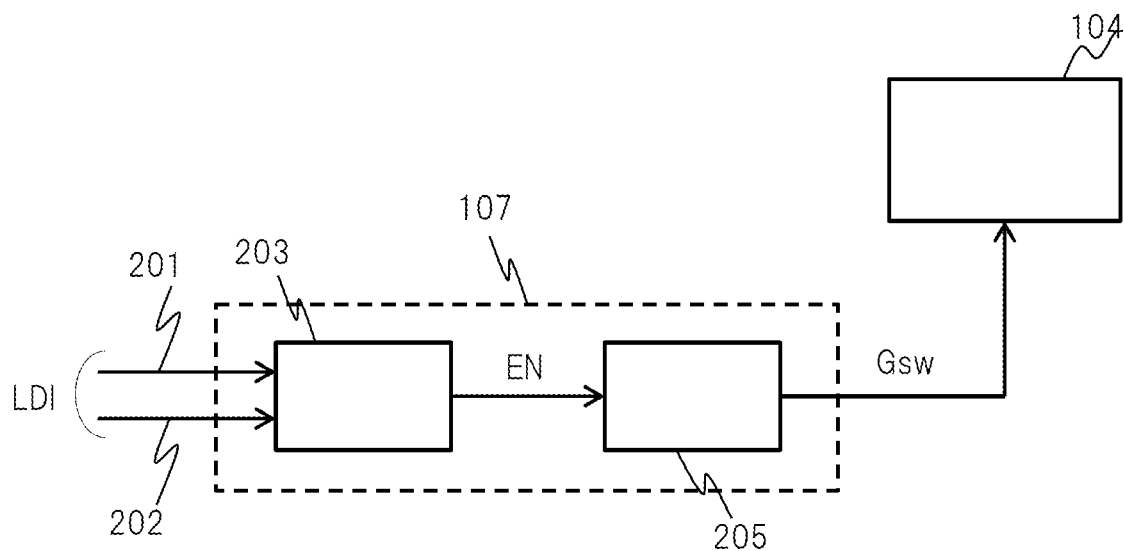
FIG. 2 is a schematic diagram showing a configuration example of a major part of a voltage doubler controller in FIG. 1.

FIG. 2 is a schematic diagram showing a configuration example of a major part of the voltage doubler controller in FIG. 1. The voltage doubler controller 107 in FIG. 2 includes an activation time calculator 203 and a switching signal calculator 205. Load power information 201 and load control information 202, which are the load information (motor information) LDI, are input to the activation time calculator 203. The load control information 202 includes time information indicating at which time the speed command value ω* of the motor 130 is increased from a predetermined value. In other words, the load control information 202 includes time information as to when activation of the voltage doubler circuit 104 is required. The load power information 201 indicates power consumption of the motor 130.

The activation time calculator 203 determines, as the activation time, the time that is earlier by a predetermined period than the time at which the speed command value of the motor 130 rises from a predetermined value, based on the load information LDI. The activation time calculator 203 asserts a voltage doubler activation signal EN at this activation time. The switching signal calculator 205 starts generating the switching signal Gsw in response to the assertion of the voltage doubler activation signal EN, and performs switching control of the switching element (not shown) in the voltage doubler circuit 104 with the switching signal Gsw.

Note that the activation time calculator 203 is implemented by, for example, program processing using a CPU (Central Processing Unit) in the microcomputer. The switching signal calculator 205 is implemented using, for example, a counter in the microcomputer.

Application Example to Metal Processing Device

Figure 3A:
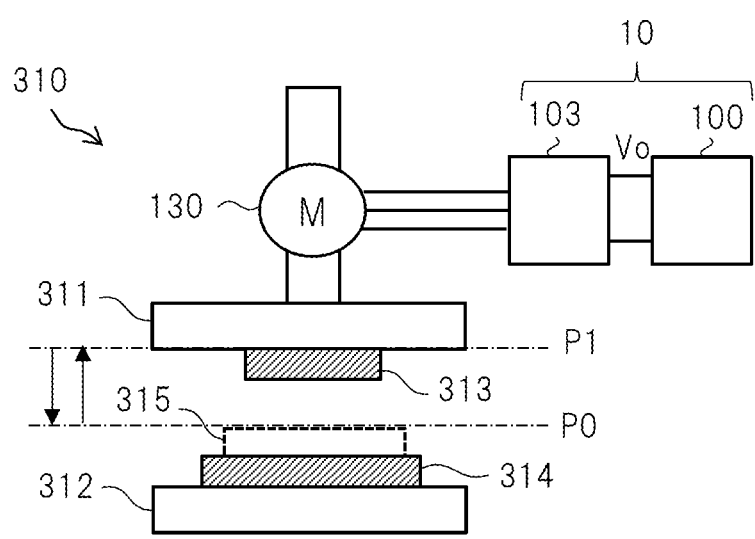
FIG. 3A is a schematic diagram showing a configuration example of a metal processing device according to the first embodiment of the present invention.

FIG. 3A is a schematic diagram showing a configuration example of a metal processing device according to the first embodiment of the present invention. A metal processing device 310 in FIG. 3A is a press machine, and is configured to process metal such as a workpiece 315 by a slide (press mechanism) 311. The metal processing device 310 includes the slide 311, a bolster 312, the motor (servo motor) 130, and the power conversion device 10. A lower mold 314 is attached to the bolster 312, and the workpiece 315 is mounted via the lower mold 314. The slide 311 is disposed so as to face the bolster 312 with the workpiece 315 interposed therebetween. An upper mold 313 is attached to the slide 311.

The motor 130 controls the position of the slide (press mechanism) 311 between a processing position P0 and a standby position P1. The processing position P0 is a position at which the workpiece (metal) 315 is processed. The power conversion device 10 includes the converter 100 and the inverter 103 as shown in FIG. 1, and controls the rotation of the motor 130 (and thus the position of the slide 311) by supplying predetermined power to the motor 130. The workpiece (metal) 315 is processed into a predetermined shape based on the shapes of the upper mold 313 and the lower mold 314 when the position of the slide 311 is controlled to the processing position P0 via the motor 130. At the time of this processing, the torque control (current control) of the motor 130 is performed as appropriate.

Figure 3B:
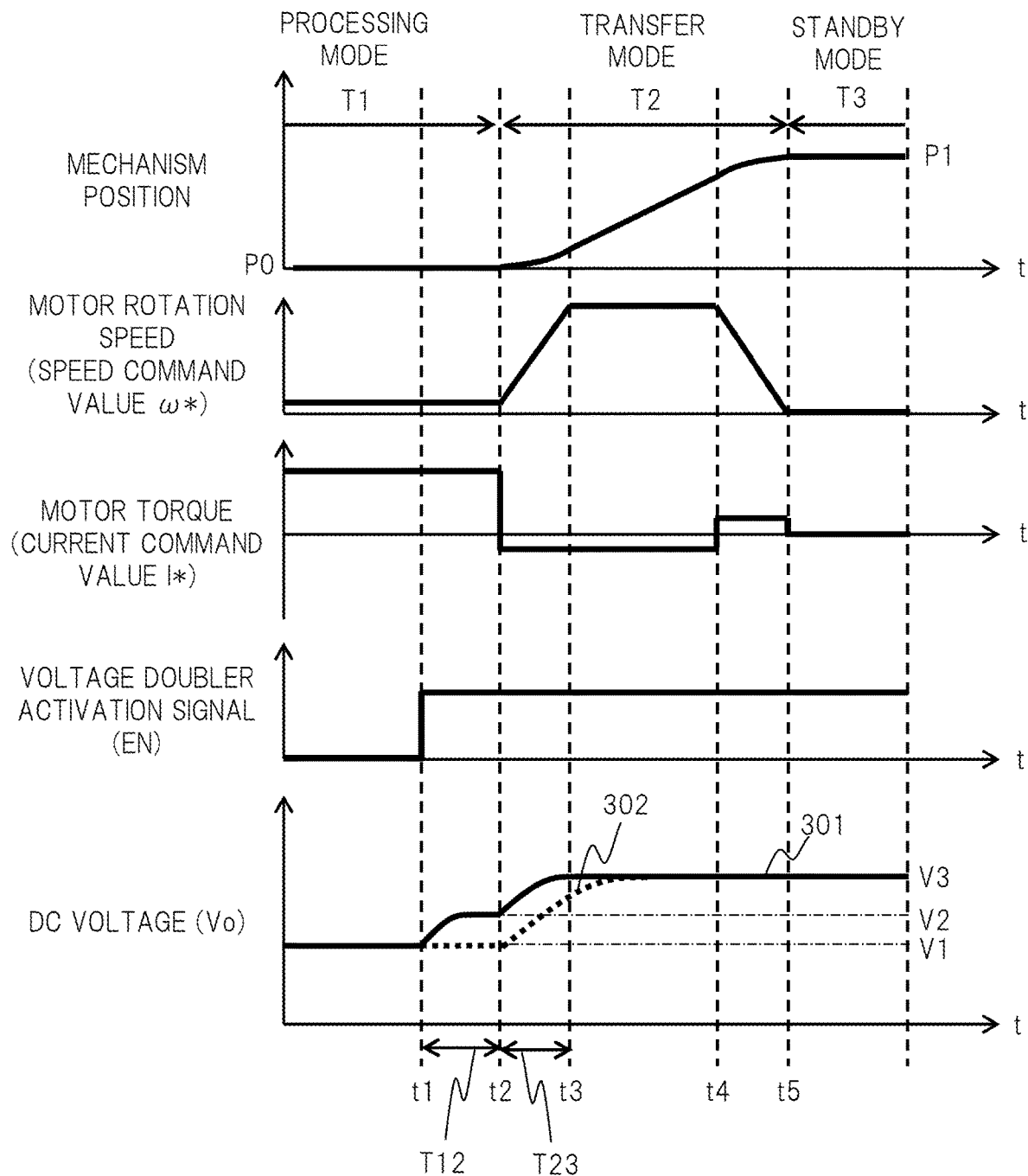
FIG. 3B is a time chart showing an operation example of the metal processing device in FIG. 3A.

FIG. 3B is a time chart showing an operation example of the metal processing device in FIG. 3A. FIG. 3B shows control states of the mechanism position (position of the slide 311), the motor rotation speed (thus speed command value ω*), the motor torque (thus current command value I*), the voltage doubler activation signal EN, and the DC voltage Vo. The motor torque (I*) is indicated with the direction in which the workpiece 315 is pressurized as positive. First, descriptions will be given to those other than the DC voltage Vo.

In the period T1 until time t2, the metal processing device 310 operates in a processing mode in which the workpiece (metal) 315 is pressurized by the slide 311. In the period T1, the mechanism position is the processing position P0. The motor rotation speed (ω*) is a low speed close to 0 because the slide 311 is in a state of pressurizing the workpiece 315. On the other hand, the motor torque (I*) is a large torque because the slide 311 is in a state of pressurizing the workpiece 315.

In the period T2 from time t2 to time t5, the metal processing device 310 operates in a transfer mode in which the slide 311 is transferred from the processing position P0 to the standby position P1. When the processing of the workpiece 315 is completed, it is desired to return the slide 311 to the standby position P1 early. Therefore, the motor rotation speed (speed command value ω*) is controlled to increase from time t2 at which the processing of the workpiece 315 is completed. In response to this, the motor 130 starts acceleration from time t2 toward the upper limit target speed determined by the speed command value ω*, and reaches the upper limit target speed at time t3. The motor 130 maintains the rotation state at the upper limit target speed in the period from time t3 to time t4.

At time t4, the motor rotation speed (ω*) is controlled to decrease such that the slide 311 is made to reach the standby position P1 in a state of being sufficiently decelerated (state where the speed is substantially 0). Then, at time t5, the slide 311 reaches the standby position P1 in a sufficiently decelerated state. The motor torque (I*) is a small negative value because it is sufficient if there is the torque capable of transferring the slide 311 in the period from time t2 to time t4. In addition, the motor torque (I*) becomes a positive value in the period from time t4 to time t5 as the motor rotation speed (ω*) decreases.

In the period T3 after time t5, the metal processing device 310 operates in a standby mode for waiting for the next processing. In the period T3, the mechanism position maintains the standby position P1, and the motor rotation speed (ω*) and the motor torque (I*) are both 0. Although not shown, a transfer mode for performing transfer in a direction opposite to that of the period T2 is provided after the standby mode T3.

Next, the DC voltage Vo will be described. As for the DC voltage Vo in FIG. 3B, a control state 301 in the case where the power conversion device 10 in FIG. 1 is used and a control state 302 in the case where the power conversion device as a comparative example is used are shown. In the period T1 of the processing mode, the voltage doubler activation signal EN is at the negate level until time t1. In response to this, the voltage doubler circuit 104 is in a stopped state.

On the other hand, the voltage doubler controller 107 asserts the voltage doubler activation signal EN at time t1. In response to this, the voltage doubler circuit 104 is activated. Namely, the voltage doubler controller 107 starts outputting the switching signal Gsw to the voltage doubler circuit 104. Thereafter, at time t2, the processing mode is switched to the transfer mode. In the transfer mode (period T2) and the subsequent standby mode (period T3), the voltage doubler controller 107 maintains the assertion level of the voltage doubler activation signal EN as it is. In response to this, the voltage doubler circuit 104 continues the boosting operation as it is even after time t2.

In the period until time T1 in the period T1, the DC voltage Vo has the voltage value V1 of the full-wave rectification because the voltage doubler circuit 104 is in the stopped state. Thereafter, in the period T12 from time t1 to time t2, the voltage doubler circuit 104 boosts the DC voltage Vo from the voltage value V1 of the full-wave rectification to the preliminary voltage value V2 higher than the voltage value V1 in response to the assertion of the voltage doubler activation signal EN. Furthermore, after time t2, the voltage doubler circuit 104 boosts the DC voltage Vo from the preliminary voltage value V2 to the voltage value V3 that is higher than the preliminary voltage value V2 and is about twice the voltage value V1.

Here, the voltage doubler circuit 104 is designed on the premise that power is supplied in the transfer mode in which the motor torque (I*) is small as shown in FIG. 3B under the demand for miniaturization of the power conversion device 10. Therefore, the voltage doubler circuit 104 is composed of, for example, an element having a size smaller than that of the inverter 103, and has a power capacity smaller than that of the inverter 103. As a result, when the voltage doubler circuit 104 is activated in the period T12 included in the period T1 of the processing mode, the DC voltage Vo cannot reach the voltage value V3 of the double voltage, and reaches a steady-state value at the voltage value V2 between the voltage value V1 and the voltage value V3.

The steady-state value (voltage value V2) is determined based on the known power capacity of the voltage doubler circuit 104 and the power consumption of the motor 130 in the processing mode. Specifically, the voltage value V2 is a voltage value when the charging current from the voltage doubler circuit 104 to the DC link unit 102 and the discharging current from the DC link unit 102 associated with the power consumption of the motor 130 are balanced. Therefore, the activation time calculator 203 in FIG. 2 can calculate the voltage value V2 by receiving the input of the load power information 201 indicating the power consumption of the motor 130 in the processing mode.

Also, the activation time calculator 203 can calculate the time required to boost the DC voltage Vo from the voltage value V1 to the voltage value V2 based on the known capacitance value or the like (that is, boosting time constant) of each capacitor (C1, C2) constituting the DC link unit 102 and the effective charging current of the DC link unit 102. The activation time calculator 203 determines the calculated time as the period T12 in FIG. 3B. Further, the activation time calculator 203 can obtain time t2 in FIG. 3B by the load control information 202. Time t2 is the time at which the slide (press mechanism) 311 starts to be transferred from the processing position P0 to the standby position P1.

Based on these pieces of information, the activation time calculator 203 asserts the voltage doubler activation signal EN at time t1 that is earlier by the period T12 than time t2 at which the speed command value ω* of the motor 130 rises from a predetermined value. Here, if time t1 is too early, the operation period of the voltage doubler circuit 104 becomes longer by that amount, and wasteful power loss may occur. On the other hand, if time t1 is too late, the mode is switched to the transfer mode before the DC voltage Vo reaches the voltage value V2. In this case, the acceleration period of the motor 130 in the period T23 from time t2 to time t3 becomes longer, and thus the period T2 of the transfer mode becomes longer.

Therefore, it is beneficial to determine time t1 such that the time at which the DC voltage Vo reaches the voltage value V2 and time t2 at which the processing mode is switched to the transfer mode substantially coincide with each other as shown in FIG. 3B. Thereafter, when the processing mode is switched to the transfer mode at time t2, the motor torque (I*) decreases, and thus the DC voltage Vo starts to rise again. Then, in the period T23, the DC voltage Vo is boosted from the voltage value V2 to the voltage value V3 that is about twice the voltage value V1 of the full-wave rectification. At this time, the rotation speed of the motor 130 can be increased by the amount of boosting of the DC voltage Vo. After time t3, the DC voltage Vo is in a steady state.

Note that, in the period T12 in FIG. 3B, the power supply voltage of the inverter 103 changes in the period of the processing mode due to the boosting of the DC voltage Vo. In this case, there is a concern about stability of the control loop in the inverter controller 108 (for example, fluctuation of the current value from the current command value I*). However, in particular, in a servo mechanism such as a metal processing device, the inverter controller 108 serving as a servo amplifier is usually designed such that the response speed of the control loop becomes sufficiently high. Therefore, it is possible to sufficiently maintain the stability of the control loop (maintain the current value at the current command value I*).

Further, in the power conversion device as the comparative example, the voltage doubler circuit 104 is activated at least after the processing mode is completed, and is activated at time t2 at which the processing mode is switched to the transfer mode at the earliest as shown by the control state 302 in FIG. 3B. In this case, starting from time t2, it takes time to boost the DC voltage Vo from the voltage value V1 to the voltage value V3, and the acceleration period of the motor 130 (thus the period of the transfer mode T2) also becomes longer in accordance with the boosting time.

Main Effect of First Embodiment

As described above, by using the method of the first embodiment, typically, it is possible to shorten the time required for acceleration of the motor 130 (that is, the period T23 in FIG. 3B). As a result, it is possible to reduce the tact time of the metal processing device 310. Furthermore, such effects can be obtained without increasing the power capacity of the voltage doubler circuit 104. Since the power capacity of the voltage doubler circuit 104 is not increased, the power conversion device 10 can be downsized.

Note that, in the example of FIG. 2, the activation time (time t1) of the voltage doubler circuit 104 is determined using the activation time calculator 203. However, normally, if the types of the workpiece 315 are the same, time t1 is also unchanged. Therefore, time t1 may be fixedly determined for each type of the workpiece 315 in advance by using a simulation or the like. In this case, for example, the load controller 109 in FIG. 1 may assert the voltage doubler activation signal EN toward the voltage doubler controller 107 at time t1 determined based on the simulation.

Further, in the example of FIG. 3B, the preliminary voltage value V2 is a value passively determined by various conditions described above. However, a method of actively determining the preliminary voltage value V2 by a control loop can also be used. For example, when the preliminary voltage value V2 determined passively is close to the voltage value V3 of the double voltage, there is a possibility that the loss of the inverter 103 in the period T12 may increase and the stability of the control loop of the inverter controller 108 may be at a level that cannot be ignored. In such a case, control to limit the upper limit value of the preliminary voltage value V2 may be performed.

Second Embodiment

Configuration and Operation of Power Conversion Device

Figure 4:
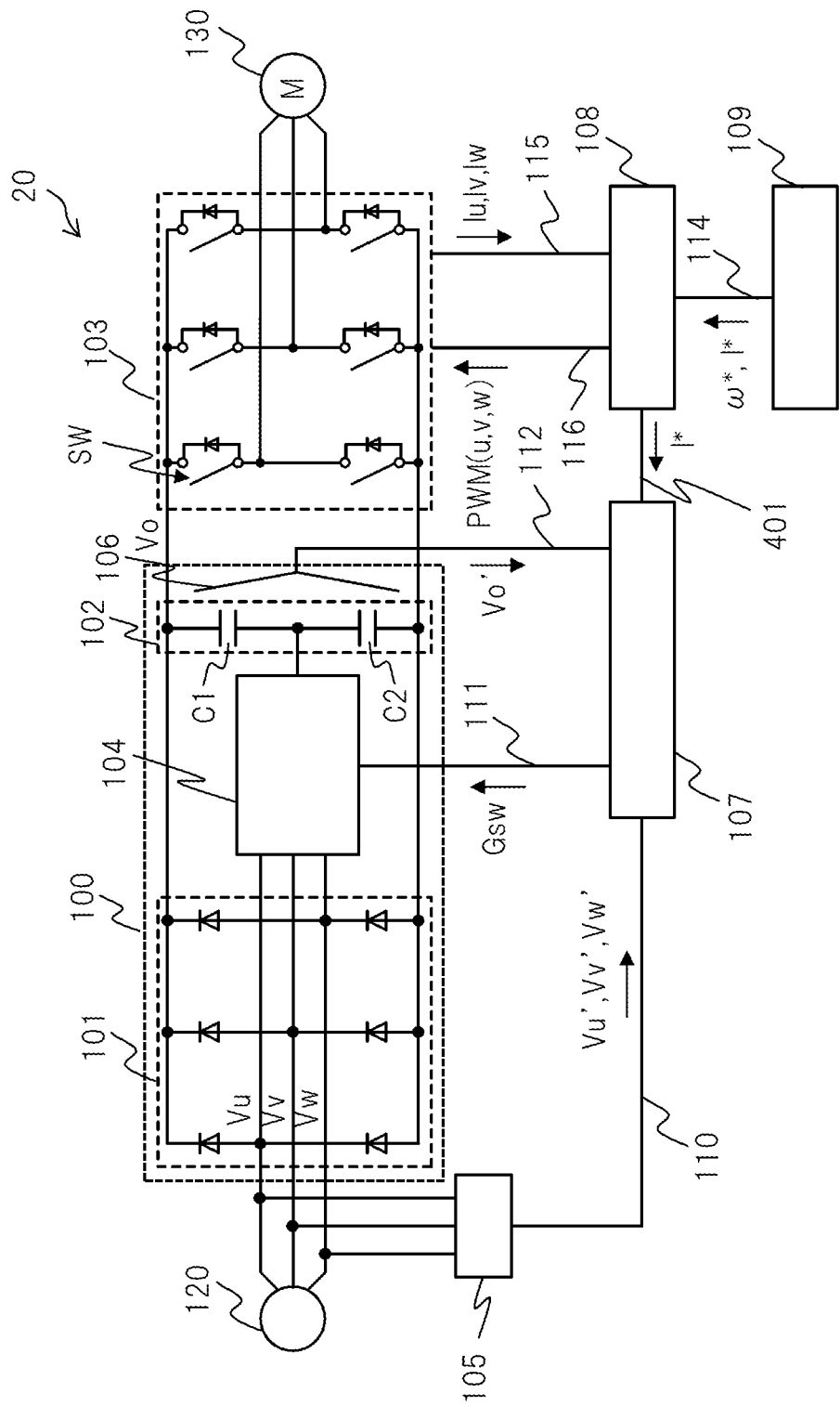
FIG. 4 is a circuit diagram showing a configuration example around a power conversion device according to the second embodiment of the present invention.

FIG. 4 is a circuit diagram showing a configuration example around a power conversion device according to the second embodiment of the present invention. A power conversion device 20 shown in FIG. 4 is different from the configuration example of FIG. 1 in the configuration and operation of the voltage doubler controller (converter controller) 107. Unlike the case of FIG. 1, the current command value I* used in the inverter controller 108 is input to the voltage doubler controller 107 via a signal line 401. The voltage doubler controller 107 determines the activation time of the voltage doubler circuit 104 (that is, time t1 in FIG. 3B) based on the change in the current command value I*.

Here, as an implementation form of the voltage doubler controller 107 and the inverter controller 108 in FIG. 4, typically, the case where they are mounted on the same microcomputer or the like, the case where they are mounted on different microcomputers or the like and then mounted on the same wiring board, or the like is conceivable. On the other hand, as described above, the load controller 109 is often provided in a high-order device located outside the housing constituting the power conversion device 20. Therefore, the signal line 401 in FIG. 4 can be made shorter than the signal line 113 in FIG. 1. As a result, it is possible to reduce communication noise, facilitate mounting, and the like.

Figure 5:
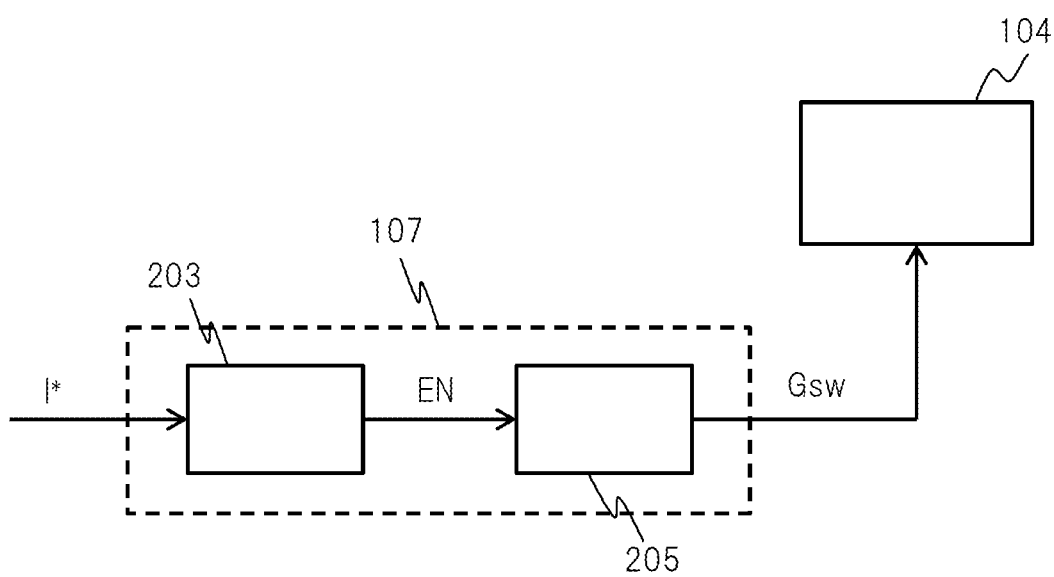
FIG. 5 is a schematic diagram showing a configuration example of a major part of a voltage doubler controller in FIG. 4.

FIG. 5 is a schematic diagram showing a configuration example of a major part of the voltage doubler controller in FIG. 4. The voltage doubler controller 107 in FIG. 5 includes the activation time calculator 203 and the switching signal calculator 205 as in the case of FIG. 2. However, unlike the case of FIG. 2, the current command value I* is input to the activation time calculator 203.

Here, in the metal processing device 310 shown in FIG. 3A, a method of performing desired processing while sequentially changing torque (that is, current command value I*) in the processing mode is generally used. Therefore, the activation time calculator 203 can estimate which time in the period T1 of the processing mode the current time is by comparing the change pattern of the current command value I* acquired from the inverter controller 108 with the change pattern held in advance. Accordingly, the activation time calculator 203 can estimate time t2 in FIG. 3B. Further, the activation time calculator 203 can calculate also the period T12 in FIG. 3B based on the acquired current command value I*. Thus, the activation time calculator 203 can calculate time t1 in FIG. 3B.

Main Effect of Second Embodiment

As described above, the same effect as that of the first embodiment can be obtained by using the method of the second embodiment. Further, the power conversion device 20 can determine the time at which the voltage doubler circuit 104 is activated without obtaining special information (for example, the load control information 202 in FIG. 2) from the load controller 109 (for example, a high-order device).

Third Embodiment

Configuration and Operation of Power Conversion Device

Figure 6:
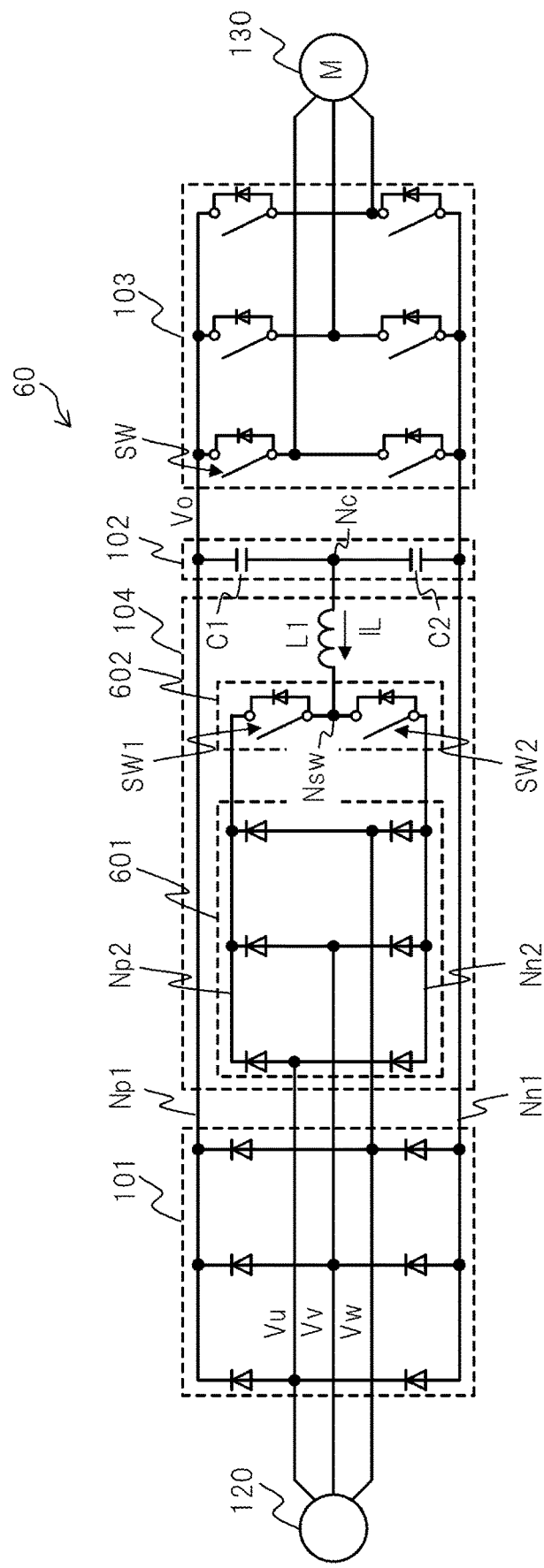
FIG. 6 is a circuit diagram showing a configuration example of a major part around a power conversion device according to the third embodiment of the present invention.

FIG. 6 is a circuit diagram showing a configuration example of a major part around a power conversion device according to the third embodiment of the present invention. FIG. 6 shows a detailed circuit configuration example of the voltage doubler circuit 104 in a power conversion device 60, unlike FIG. 1 or FIG. 3. The voltage doubler circuit 104 includes a three-phase diode bridge 601, a half bridge 602, and an inductor L1. The half bridge 602 includes two switching elements SW1 and SW2. When the voltage doubler circuit 104 is activated, the three-phase diode bridge 601 subjects the three-phase AC voltage (Vu, Vv, Vw) from the three-phase AC power supply 120 to full-wave rectification.

The inductor L1 is connected between a common connection node Nc of the two DC link capacitors C1 and C2 and a switch node Nsw. The switching element SW1 is connected between a positive electrode output node Np2 of the three-phase diode bridge 601 and the switch node Nsw. The switching element SW2 is connected between a negative electrode output node Nn2 of the three-phase diode bridge 601 and the switch node Nsw. The switching elements SW1 and SW2 are composed of, for example, IGBTs, MOSFETs, thyristors, or the like.

The voltage doubler controller (converter controller) 107 shown in FIG. 1 performs switching control of the switching elements SW1 and SW2 with a plurality of switching signals Gsw in response to the activation of the voltage doubler circuit 104. On the other hand, when the voltage doubler circuit 104 is brought into a stopped state, the voltage doubler controller 107 fixes both the switching elements SW1 and SW2 to off.

The operation of the voltage doubler circuit 104 will be described. First, the case where the switching element SW1 is controlled to be turned on and the switching element SW2 is controlled to be turned off is assumed. In this case, a charging current flows through the path of the three-phase AC power supply 120, the positive electrode output node Np2 of the three-phase diode bridge 601, the switching element SW1, the inductor L1, the DC link capacitor C2, the negative electrode output node Nn1 of the three-phase diode bridge 101, and the three-phase AC power supply 120. As a result, only the DC link capacitor C2 is charged.

Next, the case where the switching element SW2 is controlled to be turned on and the switching element SW1 is controlled to be turned off is assumed. In this case, a charging current flows through the path of the three-phase AC power supply 120, the positive electrode output node Np1 of the three-phase diode bridge 101, the DC link capacitor C1, the inductor L1, the switching element SW2, the negative electrode output node Nn2 of the three-phase diode bridge 601, and the three-phase AC power supply 120. As a result, only the DC link capacitor C1 is charged.

Then, the DC link capacitors C1 and C2 can be alternately charged by alternately switching the on-state and the off-state of the switching elements SW1 and SW2. At this time, each of the DC link capacitors C1 and C2 is charged to the full-wave rectified voltage. As a result, the DC voltage Vo becomes a double voltage that is about twice the full-wave rectified voltage. Note that the inductor L1 is provided in order to suppress inrush current to the capacitors (C1, C2) that may be generated in a period from when the voltage doubler circuit 104 is activated to when boosting of the DC voltage Vo is completed.

Further, the two three-phase diode bridges 101 and 601 are connected in parallel when viewed from the three-phase AC power supply 120. Thus, for example, in the period T12 of FIG. 3B, the large power required by the inverter 103 is mostly supplied by the three-phase diode bridge 101 and there is little necessity of being supplied by the voltage doubler circuit 104. Namely, the voltage doubler circuit 104 can boost the DC voltage Vo in a state of outputting the power smaller than that of the inverter 103. As a result, it is possible to use the low-cost and small voltage doubler circuit 104 having a smaller power capacity than the inverter 103. Specifically, for example, each of the switching elements SW1 and SW2 in the voltage doubler circuit 104 is configured to have a smaller element size than the switching element SW in the inverter 103.

Figure 7:
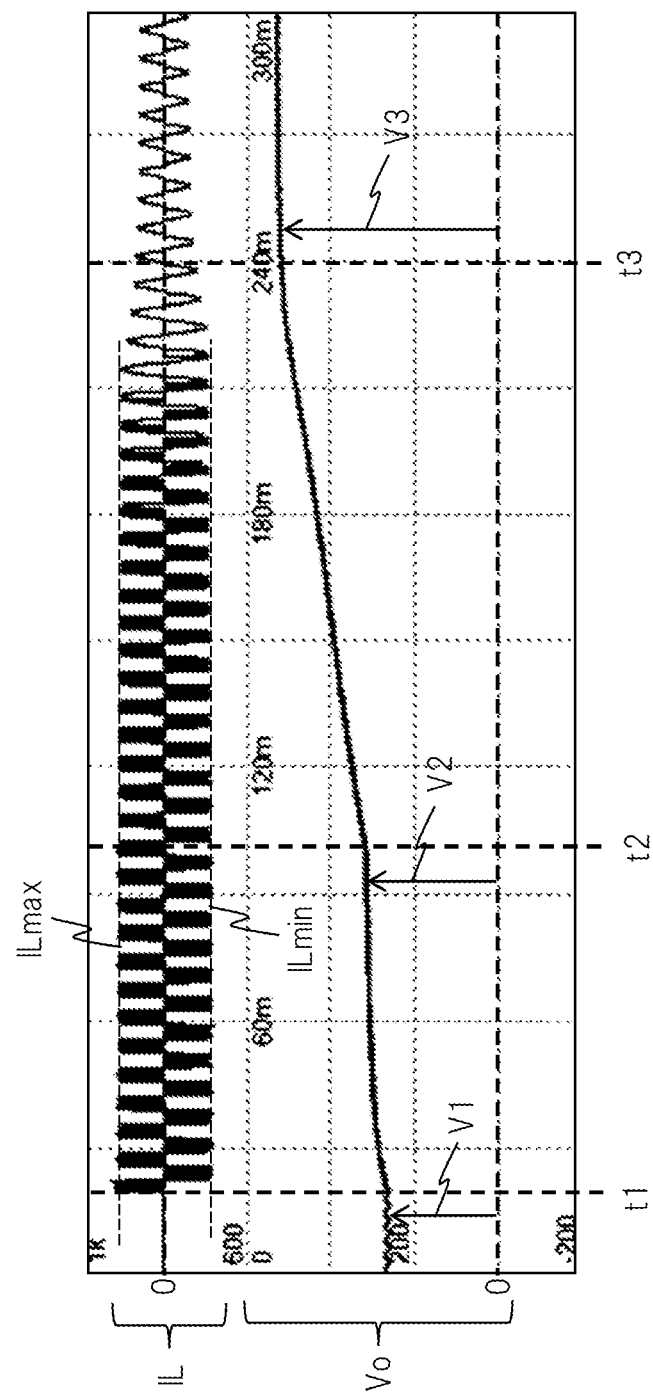
FIG. 7 is a diagram showing an example of operation verification results when the power conversion device in FIG. 6 is applied to the metal processing device in FIG. 3A.

FIG. 7 is a diagram showing an example of operation verification results when the power conversion device in FIG. 6 is applied to the metal processing device in FIG. 3A. FIG. 7 shows simulation results of the inductor current IL flowing through the inductor L1 and the DC voltage Vo for a period from around time t1 to around time t3 in FIG. 3B. In the period until time t1 in FIG. 7, since the voltage doubler circuit 104 is in the stopped state, the inductor current IL is 0, and the DC voltage Vo is the full-wave rectified voltage (voltage value V1). After the voltage doubler circuit 104 is activated at time t1, the inductor current IL changes to a high frequency form by soft start control immediately after the activation.

Specifically, first, in accordance with the control of the switching elements SW1 and SW2 described above, the inductor current IL alternately switches between a positive current and a negative current for each predetermined period. The predetermined period is determined based on, for example, switching of the maximum voltage phase or the minimum voltage phase in the three-phase AC voltage (Vu, Vv, Vw), and is a period corresponding to an electrical angle of 60° of the AC phase. The timing at which the maximum voltage phase or the minimum voltage phase is switched is detected using the AC voltage sensor 105 in FIG. 1.

Then, the voltage doubler controller 107 in FIG. 1 intermittently controls the on-side switching element (SW1 or SW2) to on within the period corresponding to an electrical angle of 60° such that the inductor current IL does not exceed a predetermined limit range (ILmin to ILmax). In other words, the switching of the on-side switching element is controlled at a high switching frequency. Such control is referred to as soft start control. Namely, in a period in which the voltage is boosted, a large inrush current (that is, overcurrent) may flow through the DC link capacitors C1 and C2, and thus the voltage doubler controller 107 prevents the overcurrent by using the soft start control.

The DC voltage Vo starts to rise from time t1 and reaches a steady state at the preliminary voltage value V2. At time t2, the processing mode is switched to the transfer mode and the required motor current decreases, so that the DC voltage Vo starts to rise again. In addition, the inductor current IL hardly changes before and after time t2. At time t3, the DC voltage Vo reaches a double voltage (voltage value V3).

Here, at around time t3, the voltage of the three-phase AC power supply 120 and the voltages of the DC link capacitors C1 and C2 antagonize each other, and thus the inductor current IL decreases to a value less than the limit range (ILmin to ILmax). As a result, the intermittent control of the switching elements SW1 and SW2 does not occur. Then, the state is stabilized, with the switching elements SW1 and SW2 being subjected to switching control for each period of the electrical angle of 60°. In other words, the stable state is obtained at the switching frequency three times the frequency of the three-phase AC power supply 120.

Main Effect of Third Embodiment

As described above, by using the method of the third embodiment, it is possible to shorten the time required for acceleration of the motor 130 without increasing the power capacity of the voltage doubler circuit 104 as in the cases of the first and second embodiments. Furthermore, use of the voltage doubler circuit 104 of a parallel connection system shown in FIG. 6 makes it possible to reduce power loss. Namely, as a circuit system of the voltage doubler circuit, for example, a system in which elements are inserted in series on a path between the three-phase diode bridge 101 and the DC link unit 102 is also known. In this case, wasteful power loss may occur in the full-wave rectification mode due to the elements inserted in series. Such power loss does not occur when using the circuit system in FIG. 6.

In the foregoing, the invention made by the inventors of this application has been concretely described based on the embodiments. However, the present invention is not limited to the foregoing embodiments and various changes can be made within the scope not departing from the gist thereof. For example, the above embodiments have described the present invention in detail in order to make the present invention easily understood, and the present invention is not necessarily limited to that having all the described configurations. Also, a part of the configuration of one embodiment may be replaced with the configuration of another embodiment, and the configuration of one embodiment may be added to the configuration of another embodiment. Furthermore, a configuration may be added to a part of the configuration of each embodiment, and a part of the configuration of each embodiment may be eliminated or replaced with another configuration.

For example, although an example of application of the power conversion device to the metal processing device has been described here, the application is of course not limited thereto, and the application to various devices (systems) that operate by appropriately switching between the full-wave rectification mode and the voltage doubler rectification mode in accordance with switching of the rotation speed of the motor is also possible in the same manner.

REFERENCE SIGNS LIST 10, 20, 60: power conversion device, 100: converter, 101, 601: three-phase diode bridge, 102: DC link unit, 103: inverter, 104: voltage doubler circuit, 107: voltage doubler controller (converter controller), 108: inverter controller, 109: load controller, 130: motor, 310: metal processing device, 311: slide (press mechanism), 315: workpiece (metal), C1, C2: DC link capacitor, EN: voltage doubler activation signal, L1: inductor, SW, SW1, SW2: switching element, Vo: DC voltage

The invention claimed is:

1. A power conversion device that supplies power to a motor, the power conversion device comprising:
a converter configured to convert an AC voltage from outside into a DC voltage;
a converter controller configured to control the converter,
wherein the converter includes a voltage doubler circuit configured to boost the DC voltage when activated, and outputs the DC voltage having a voltage value different in accordance with activation and stop of the voltage doubler circuit, and
wherein the converter controller activates the voltage doubler circuit at a first time that is earlier by a predetermined period than a second time at which a speed command value of the motor rises from a predetermined value;
an inverter including a plurality of switching elements and configured to convert the DC voltage from the converter into an AC voltage and output the AC voltage to the motor; and
an inverter controller configured to perform switching control of the plurality of switching elements in the inverter such that a rotation speed of the motor approaches the speed command value;
wherein the converter includes:
a first three-phase diode bridge;
a first DC link capacitor and a second DC link capacitor connected in series between a positive electrode output node and a negative electrode output node of the first three-phase diode bridge; and
a second three-phase diode bridge, a first switching element, a second switching element, and an inductor that constitute the voltage doubler circuit,
wherein the inductor is connected between a common connection node of the first DC link capacitor and the second DC link capacitor and a switch node,
wherein the first switching element is connected between a positive electrode output node of the second three-phase diode bridge and the switch node,
wherein the second switching element is connected between a negative electrode output node of the second three-phase diode bridge and the switch node, and
wherein the converter controller performs switching control of the first switching element and the second switching element in accordance with activation of the voltage doubler circuit.

2. The power conversion device according to claim 1,
wherein the converter boosts the DC voltage from a first voltage value to a second voltage value higher than the first voltage value in the predetermined period, and boosts the DC voltage from the second voltage value to a third voltage value higher than the second voltage value after the second time.

3. The power conversion device according to claim 2,
wherein the second voltage value is a steady-state value determined based on power capacity of the voltage doubler circuit and power consumption of the motor, and
wherein the predetermined period is determined based on a time until the DC voltage reaches the steady-state value from the first voltage value.

4. The power conversion device according to claim 1,
wherein each of the first switching element and the second switching element is configured to have an element size smaller than that of each of the plurality of switching elements in the inverter.

5. A metal processing device that processes a metal as a workpiece by a press mechanism, the metal processing device comprising:
a motor configured to control a position of the press mechanism between a processing position when the metal is processed and a predetermined standby position; and
a power conversion device configured to supply power to the motor,
wherein the power conversion device includes:
a converter configured to convert an AC voltage from outside into a DC voltage;
a converter controller configured to control the converter,
wherein the converter includes a voltage doubler circuit configured to boost the DC voltage when activated, and outputs the DC voltage having a voltage value different in accordance with activation and stop of the voltage doubler circuit, and
wherein the converter controller activates the voltage doubler circuit at a first time that is earlier by a predetermined period than a second time at which a speed command value of the motor rises from a predetermined value,
wherein the second time is a time at which transfer of the press mechanism from the processing position to the standby position is started,
wherein the power conversion device further includes:
an inverter including a plurality of switching elements and configured to convert the DC voltage from the converter into an AC voltage and output the AC voltage to the motor; and
an inverter controller configured to perform switching control of the plurality of switching elements in the inverter such that a rotation speed of the motor approaches the speed command value or a current value of the motor approaches a current command value;
wherein the converter includes:
a first three-phase diode bridge;
a first DC link capacitor and a second DC link capacitor connected in series between a positive electrode output node and a negative electrode output node of the first three-phase diode bridge; and
a second three-phase diode bridge, a first switching element, a second switching element, and an inductor that constitute the voltage doubler circuit,
wherein the inductor is connected between a common connection node of the first DC link capacitor and the second DC link capacitor and a switch node,
wherein the first switching element is connected between a positive electrode output node of the second three-phase diode bridge and the switch node,
wherein the second switching element is connected between a negative electrode output node of the second three-phase diode bridge and the switch node, and
wherein the converter controller performs switching control of the first switching element and the second switching element in accordance with activation of the voltage doubler circuit.

6. The metal processing device according to claim 5,
wherein the converter boosts the DC voltage from a first voltage value to a second voltage value higher than the first voltage value in the predetermined period, and boosts the DC voltage from the second voltage value to a third voltage value higher than the second voltage value after the second time.

7. The metal processing device according to claim 6,
wherein the second voltage value is a steady-state value determined based on power capacity of the voltage doubler circuit and power consumption of the motor associated with the metal processing, and
wherein the predetermined period is determined based on a time until the DC voltage reaches the steady-state value from the first voltage value.

8. The metal processing device according to claim 5, wherein each of the first switching element and the second switching element is configured to have an element size smaller than that of each of the plurality of switching elements in the inverter.

9. The metal processing device according to claim 5, wherein the converter controller receives an input of the current command value used in the inverter controller, and determines the first time based on a change in the current command value.

* * * * *